Figures 1, 2, 3, 4:
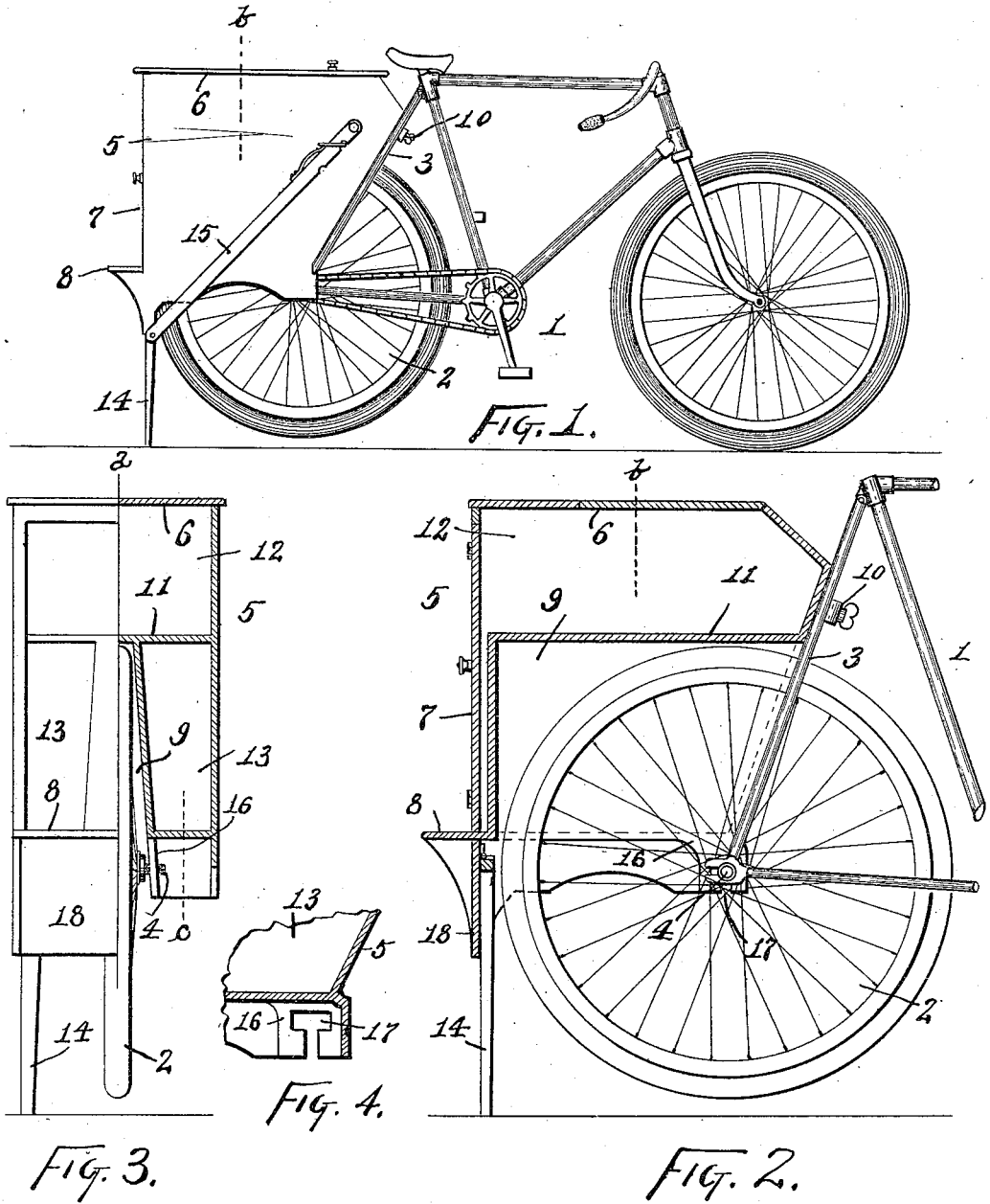

(No Model.)

G. H. HENKEL.
PARCEL CARRIER FOR BICYCLES.

No. 579,753. Patented Mar. 30, 1897.

Witnesses:
E. R. Shipley.
M. S. Belden.

George H. Henkel
Inventor
by James W. See
Attorney

UNITED STATES PATENT OFFICE.

GEORGE H. HENKEL, OF MIDDLETOWN, OHIO.

PARCEL-CARRIER FOR BICYCLES.

SPECIFICATION forming part of Letters Patent No. 579,753, dated March 30, 1897.

Application filed October 14, 1896. Serial No. 608,797. (No model.)

*To all whom it may concern:*

Be it known that I, GEORGE H. HENKEL, of Middletown, Butler county, Ohio, have invented certain new and useful Improvements in Parcel-Carriers for Bicycles, of which the following is a specification.

This invention pertains to attachments to bicycles for the carriage of parcels, mail, &c.; and the invention will be readily understood from the following description, taken in connection with the accompanying drawings, in which—

Figure 1 is a side elevation of a bicycle provided with my improved parcel-carrier; Fig. 2, a side elevation of the rear portion of the bicycle, the parcel-carrier appearing in vertical section in the plane of line *a* of Fig. 3; Fig. 3, a rear elevation, and half-vertical section, in the plane of line *b* of Figs. 1 and 2, of the parcel-carrier as mounted on the bicycle; and Fig. 4, a vertical section of a portion of the parcel-carrier in the plane of line *c* of Fig. 3, showing one of the step-engaging recesses.

In the drawings, 1 indicates the bicycle, of usual safety type; 2, its rear wheel; 3, the rear diagonals of the cycle-frame, straddling the rear wheel and leading from the rear axle up to the saddle-joint; 4, the usual steps of the bicycle, there being in this case one at each side of the rear wheel; 5, the parcel-carrier, consisting of a box-like structure having its rear wall arranged at an angle so as to lie against the frame-diagonals 3, the base of the box coming down to about the level of the rear axle of the cycle and the rear wheel of the cycle projecting up into the box, the rear wall of the box coming outwardly beyond the rear of the rear wheel, and the width of the box sidewise being preferably somewhat less than the spread of the handle-bars of the bicycle or the extreme sidewise measurement of the cranks of the bicycle, so that the box will pass through any space through which the bicycle will otherwise pass; 6, the top of the box, formed, preferably, with a removable lid, so as to give access downwardly into the box; 7, a door in the rear wall of the box and having, preferably, dimensions almost equal to the rear of the box, so that the opening of this door will expose the whole interior of the box, this door being open in Fig. 3; 8, a hearth projecting outwardly from the rear of the box under door 7; 9, the recess formed in the box to permit it to straddle the rear wheel of the bicycle, this recess having a roof and a rear wall and side walls; 10, a clamp carried at the rear upper portion of the box and having the form of a button adapted to pass forwardly between rear diagonals 3 of the bicycle-frame and to be turned so as to clamp the upper portion of the box against those diagonals; 11, the roof of recess 9 in the box, prolonged sidewise to join the main side walls of the box; 12, the compartment formed in the upper part of the box over roof 11, this compartment being the full width of the box and having a depth equal to the distance from the top of the box down to roof 11, this compartment extending from the front to the rear of the box and being rendered accessible from the top by lid 6 and from the rear by door 7; 13, side compartments formed at each side of the rear wheel and extending from the front of the box to its rear and from the base of the box up to roof 11, access to these two compartments being given by door 7; 14, a pair of united legs, one leg at each side of the box, and having its top hinged to the under rear portion of the box, these legs being capable of folding up under the box and having such length that when they are down the rear wheel of the bicycle will be sustained free from the ground; 15, a latch-bar pivoted at its lower end to the double leg 14 and lying against the side of the box and having a handle at its upper end within convenient reach of the rider on the saddle of the bicycle, this rod being provided with notches, as shown, to engage over a retaining-detent, so that the legs will be held thereby in folded or unfolded position; 16, a pair of ears projecting downward from the forward portion of the bottom of the box at each side of recess 9 in position to correspond with the rear axle of the bicycle; 17, recesses in these ears having preferably a T shape and being open downwardly, these recesses being adapted to engage over the steps 4 of the bicycle, and 18, a rigid curtain disposed below hearth 8 in the plane of the rear wall of the box, the side walls of the box being extended downwardly somewhat below the bottom of the box to engage the ends of this curtain.

The bicycle requires no change in order to receive the parcel-carrier, it being only requisite that the parcel-carrier shall have dimensions, &c., adapting it to fit the bicycle. The box is to be set over the rear wheel with recesses 17 over the steps of the bicycle, clamp 10 serving to tie the box to the bicycle-frame. The legs being down in the position shown, the rear of the bicycle is elevated and the whole forms a stable structure resting on three points and permitting parcels to be put into the carrier. Parcels may be put into the side compartments 13 through the door 7, and upper compartment 12 may also be filled through door 7. By putting small parcels in the upper compartment they may be gotten out by opening lid 6, thus permitting the delivery of such parcels by the rider while still in his seat. Before the rider mounts he is to pull upward on bar 15, thus lowering the rear wheel to the ground and folding the legs up under the box. Just before he dismounts he may lower bar 15, thus lowering the legs sufficiently to touch the ground, and a trifling continued advance of the bicycle causes the legs to take the vertical position and elevate the rear wheel. This adjustment of the legs and elevation of the rear wheel may also be made after the rider has dismounted. Curtain 18 ties the box across under the rear door and serves as a rear stop or stay for the legs. Hearth 8 gives additional strength to the bifurcated box structure and also facilitates overhauling the contents of the side compartments 13.

I claim as my invention—

1. In a parcel-carrier for a bicycle, the combination, substantially as set forth, of a box-like structure comprising a pair of compartments separated by a recess adapted to straddle the rear wheel of a bicycle and united by ties at the top and rear of said recess, and attaching devices carried by said structure and adapted to engage the frame and steps of the bicycle.

2. In a parcel-carrier for a bicycle, the combination, substantially as set forth, of a box-like structure comprising two compartments separated by a recess adapted to straddle the rear wheel of a bicycle and united at their tops by a compartment extending across over the top of said recess, a door in the rear wall of said box structure, and attaching devices carried by said structure and adapted to engage the frame and steps of a bicycle.

3. In a parcel-carrier for a bicycle, the combination, substantially as set forth, of a box-like structure comprising two compartments separated by a recess adapted to straddle the rear wheel of a bicycle, recessed ears carried by the front lower portion of said structure and adapted to engage the steps of the bicycle, and a clamp carried by the front upper portion of said box structure and adapted to engage the rear diagonals of the bicycle-frame.

4. In a parcel-carrier for a bicycle, the combination, substantially as set forth, of a box-like structure having a recess open at its front and base and adapted to straddle the rear wheel of a bicycle, attaching devices carried by said structure and adapted to engage the steps and frame of a bicycle, a pair of united legs hinged to the rear base of said structure and adapted to fold up thereunder and straddle said wheel and having a length adapted when the legs are vertical to sustain the rear wheel of the bicycle free of the ground, and a handle-bar connected with said pair of legs and having detents to hold the legs in vertical and folded position alternatively.

GEORGE H. HENKEL.

Witnesses:
WALTER S. HARLAN,
C. FARIES.